(12) United States Patent
Löffelmann et al.

(10) Patent No.: US 12,515,980 B2
(45) Date of Patent: Jan. 6, 2026

(54) FIBRE COIL AND WINDING DEVICE FOR WINDING A FIBRE COIL

(71) Applicant: NORTHROP GRUMMAN LITEF GMBH, Freiburg (DE)

(72) Inventors: Ute Löffelmann, Glottertal (DE); Markus Helbling, Freiburg (DE); Daniel Wiegand, Freiburg (DE)

(73) Assignee: NORTHROP GRUMMAN LITEF GMBH, Freiburg (DE)

( * ) Notice: Subject to any disclaimer, the term of this patent is extended or adjusted under 35 U.S.C. 154(b) by 327 days.

(21) Appl. No.: 17/912,105

(22) PCT Filed: Mar. 16, 2021

(86) PCT No.: PCT/EP2021/056643
§ 371 (c)(1),
(2) Date: Sep. 16, 2022

(87) PCT Pub. No.: WO2021/185818
PCT Pub. Date: Sep. 23, 2021

(65) Prior Publication Data
US 2023/0183122 A1  Jun. 15, 2023

(30) Foreign Application Priority Data
Mar. 17, 2020  (DE) ...................... 10 2020 107 332.1

(51) Int. Cl.
*C03B 37/12* (2006.01)
(52) U.S. Cl.
CPC ................................... *C03B 37/12* (2013.01)

(58) Field of Classification Search
CPC ........ C03B 37/12; B65H 55/00; B65H 5/005; B65H 54/00; G02B 6/44; F41G 7/32; B29C 64/112
See application file for complete search history.

(56) References Cited

U.S. PATENT DOCUMENTS

| | | | |
|---|---|---|---|
| 4,699,451 A | 10/1987 | Mohr | |
| 4,955,688 A | 9/1990 | Chapin | |
| 4,978,413 A | 12/1990 | Schotter | |
| 5,029,772 A * | 7/1991 | Redford | ................. B65H 55/00 102/504 |

(Continued)

FOREIGN PATENT DOCUMENTS

| | | |
|---|---|---|
| DE | 69022271 T2 | 3/1996 |
| DE | 69622093 T2 | 3/2003 |

OTHER PUBLICATIONS

International Search Report and Written Opinion issued in connection with corresponding PCT Patent Application No. PCT/EP2021/056643 dated May 11, 2021.

*Primary Examiner* — Andrew L Swanson
(74) *Attorney, Agent, or Firm* — Tarolli, Sundheim, Covell & Tummino LLP

(57) ABSTRACT

The invention relates to a winding device (100) for winding a fibre coil, comprising a coil carrier (110) for wrapping with fibre (210) in order to produce a coil body (220) made of wound fibres (210), a fibre supply (120) for supplying a fibre (210) for wrapping the coil carrier (110), and an adhesive device (130) for producing droplets of adhesive (140) for bonding the outermost layer of fibres (210) on the coil body (220) to fibres (210) freshly laid onto the coil body (220).

15 Claims, 3 Drawing Sheets

(56) References Cited

U.S. PATENT DOCUMENTS

| | | | | |
|---|---|---|---|---|
| 5,064,490 | A | * | 11/1991 | Chapin ................ B65H 55/00 156/169 |
| 5,161,208 | A | | 11/1992 | Christie |
| 5,186,781 | A | | 2/1993 | Verville |
| 5,228,631 | A | * | 7/1993 | Hu ..................... G02B 6/4457 242/470 |
| 5,261,023 | A | | 11/1993 | Darsey |
| 5,371,593 | A | | 12/1994 | Cordova |
| 5,607,532 | A | * | 3/1997 | LoStracco ........... G02B 6/4457 156/169 |
| 5,710,853 | A | * | 1/1998 | Von Hoessle ........... F41G 7/32 156/428 |
| 2019/0204519 | A1 | * | 7/2019 | Sato ..................... G02B 6/448 |

* cited by examiner

FIBRE COIL AND WINDING DEVICE FOR WINDING A FIBRE COIL

RELATED APPLICATIONS

The present invention is a U.S. National Stage under 35 USC 371 patent application, claiming priority to Serial No. PCT/EP2021/056643, filed on Mar. 16, 2021, which claims priority from German Patent Application No. 10 2020 107 332.1 filed on Mar. 17, 2020; the entireties of both are hereby incorporated herein by reference.

The present invention relates to winding devices for winding fiber coils and fiber coils produced thereby.

Fiber coils made of glass fibers provided with a coating are frequently used in modern rotation rate sensors. For reliable measurements, it is important that the glass fibers in the fiber coil are wound without excessive tensile stress, pressure and torsion in order to keep the polarization of the light running in the fibers as homogeneous as possible or to avoid crosstalk into another polarization state. For this purpose, the fibers should be wound as homogeneously and orderly as possible. In addition, the individual fiber sections should be fixed with respect to their neighbors as far as possible in order to avoid displacement of fiber sections in a finished coil.

A large number of fiber windings must be present to ensure high precision of the rotation rate sensors. Therefore, in order to keep the fiber coil as compact as possible, coils with the highest possible packing density of fibers are aimed for. This also has the advantage of limiting fiber movements within the fiber coil from the outset.

Finally, the aim is to be able to offer high-quality coils at reasonable cost. To this end, the fiber coils must preferably be producible in a fully automated process with short production times. Manual interaction or long downtimes in the production chain are to be avoided.

These objectives are in part not satisfactorily achieved by the techniques usually used to produce fiber coils.

For example, a common process consists of winding fibers around a coil carrier and potting the coil body thus produced as a whole in a potting mold with potting compound, such as a resin, silicone or the like. Subsequently, the potting compound is cured in an oven to obtain an inherently fixed fiber coil.

However, the winding of the fibers must not be too compact, since otherwise it cannot be ensured that the potting compound penetrates the entire coil body and thus fixes the entire fiber. In addition, if the winding is tight, newly wound fibers would cut into the previously applied fiber layers due to the tension required for winding, resulting in undesirable compressive or tensile forces within the fiber coil that could lead to unwanted displacement of individual fiber sections. Thus, the fiber coils cannot be produced in a maximally compact manner during subsequent potting.

In addition, there is the problem with this process that even in homogeneously wound coils, displacements of the individual fiber sections or fiber layers occur due to the penetrating potting compound. The finished coils are therefore often no longer homogeneously and compactly wound, even if they are initially homogeneous wound.

The transfer of the potting molds to the oven used for curing the potting compound and the removal of the coils from the potting mold are usually done by hand. This delays the production process. In addition, the potting molds have to be replaced after a few operations because the potting compound increasingly adheres to them. If not handled properly, there is thus a risk of fiber breaking in the coil body, rendering the coil unusable.

In another process for producing fiber coils, the individual fiber sections are already bonded together during winding. For this purpose, the last outer layer of the fiber, which has already been wound, is coated with an adhesive by means of a brush. The next layer of fiber is wound on top of this and bonded directly to the coil body as a result of the adhesive. This eliminates the problems associated with a potting mold. In addition, the individual fiber layers can be wound more tightly.

On the other hand, this process is extremely tedious and can only produce about one coil per day, making the cost per coil very high. In addition, the brush acts mechanically on the fibers, which can also lead to a displacement of the fiber sections and thus destroy a previously existing homogeneous winding pattern. Similarly, the adhesive does not cure completely until the coil body is finished, i.e., placing new fibers or improper handling can also cause subsequent displacement of the fiber sections.

Typically, the brush application uses 2-component reactive adhesives, such as epoxy resins, which are mixed together, and the curing of which is based on the reaction of the two components with one another. From the time of mixing, the viscosity of these adhesives begins to increase, and the adhesive becomes increasingly viscous. This increases the risk of fiber sections shifting in position during the application of the adhesive and/or the adhesive being distributed in an uneven layer on the coil carrier. The increase in viscosity results in a maximum processing time for 2-component reactive adhesives, also known as pot life. This necessitates regular cleaning or disposal of the equipment used for the application and involves the risk of clogging when using equipment with ducts and/or nozzles.

The removal of the adhesive with the brush entails that the adhesive cannot be provided completely free of environmental influences, as it would otherwise not be accessible to the brush. As a result, the properties of the adhesive may change during the production of the coil due to the service life of the adhesive until the coil is completed. This can reduce the reliability and accuracy of the fiber coil. Furthermore, impurities can get into the adhesive via the brush, leading to a deterioration of the adhesive properties of the adhesive and thus to a deterioration of the fixation of the fibers in the fiber coil. Brush hairs can also become detached and remain in the fiber coil, which, in turn, is problematic for the homogeneity of the winding.

The present invention is concerned with the object of solving the problems outlined above. It is intended to specify a device for winding fiber coils, with which fiber coils can be wound in an automatic, compact and homogeneous manner. Furthermore, fiber coils are to be provided which are wound compactly and homogeneously. These objects are achieved by the respective subject matter of the independent claims.

A winding device for winding a fiber coil can comprise a coil carrier for wrapping with fiber to produce a coil body made of wound fiber, a fiber feeder for feeding a fiber for wrapping the coil carrier, and an adhesive device suitable for producing droplets of adhesive for bonding the outermost layer of fiber on the coil body to fiber newly placed onto the coil body.

In this connection, the coil carrier and the fiber feeder serve to wind a fiber coil, e.g., of glass fiber, in a manner known per se. However, instead of potting the fiber coil only subsequently or laboriously applying adhesive fiber layer by fiber layer with a brush or the like, the winding device has an adhesive device with which droplets of adhesive can be generated. These droplets of adhesive are applied by the adhesive device to the coil body or to the fiber newly provided by the fiber feeder in order to bond the fiber newly placed onto the coil body to the fiber already present. For this purpose, the droplets can be shot onto the fiber or dropped onto it. However, it is also conceivable to route the newly fed fiber through an adhesive mist, whereby droplets of adhesive are deposited on the fiber.

In this way, it is possible to fix the fiber of the fiber coil in the desired position by means of the adhesive as soon as it is placed onto the coil. This allows the winding to be carried out homogeneously. Since the adhesive is applied in drop form, mechanical contact with the fiber is not necessary. Nor is it necessary to pot the coil. This ensures that the homogeneous winding is not subsequently destroyed again. Adhesives made from compounds that could not be inserted into a potting mold because they would adhere too strongly to it can also be used. In addition, before the adhesive is ejected in drop form, it can be held in a reservoir in such a manner that no change occurs in the adhesive, e.g., by keeping it airtight. The ejection of the droplets of adhesive can also be automated, so that no manual intervention needs to be performed that would delay the winding process.

The adhesive device can be suitable for producing the droplets of adhesive having a predetermined size, preferably by means of a volumetric dosing method. This ensures that exactly the necessary amount of adhesive is available to achieve the densest possible packing of the fiber in the coil body without generating excess adhesive on or within the coil body, which would have a negative effect on the homogeneity of the winding. This can further increase the quality of the winding and thus the reliability of the fiber coil.

In this connection, the droplets of adhesive, for example, can be generated by means of jet valve technology, in which a cylinder or plunger presses the adhesive through a narrow duct at a predefined pressure. Determined by the geometry of the duct and the pressure, a droplet of a specific volume is released from the duct.

The adhesive device can be suitable for conveying the droplets of adhesive specifically to the outermost layer of fiber on the coil body. Accordingly, the exact position at which the droplets of adhesive strike and adhere to the already wound coil body can be set. It is thus possible to define a predeterminable structure of adhesive dots within the coil body that holds the fiber of the fiber coil together. In addition, it is possible to apply the droplets of adhesive to the coil body in a controlled and automatic manner in such a way that, during automatic winding, the newly wound fiber always runs over the droplet of adhesive and is thereby bonded to the coil body.

Preferably, jet valve technology can also be used for this purpose. Due to the low weight of the droplet released from the duct, it continues to fly in good approximation in a straight line in the direction specified by the duct after it has exited the duct. This can be used to shoot droplets of adhesive specifically onto the coil body. In this connection, the direction of flight can be arbitrary, in particular, from bottom to top, if this is necessary for reasons of space in the winding device. Preferably, the droplet of adhesive hits the coil body vertically.

A distance between a discharge point of the droplets of adhesive from the adhesive device and the outermost layer of fiber can be less than 10 cm, preferably less than 5 cm. This prevents the droplets of adhesive from having to cover too great a distance. It has been shown that if the distance is too long, the droplets of adhesive do not land as individual droplets on the coil body, but in some cases form satellite droplets around a main droplet, which can land elsewhere. This would prevent the targeted application of adhesive and thus the targeted bonding of fibers. However, this effect no longer occurs at smaller distances of, for example, less than 10 cm, 7 cm, 5 cm or 3 cm. The adhesive device can also be mounted so close to the coil body that ejected droplets reach the coil body almost instantaneously. It is also conceivable to eject the droplets of adhesive combined into a jet to form an adhesive web in direct contact with the coil body.

The winding device can further comprise a positioning device suitable for moving the coil carrier and/or the adhesive device in such a manner that the droplets of adhesive hit a predetermined position on the outermost layer of fiber on the coil carrier. In this way, the adhesive device can, for example, be moved by means of a linear table or can be dynamically moved in its angle to the coil surface in order to be able to apply droplets of adhesive over the entire width of the coil body. In addition, the coil carrier can be rotated around the coil axis and/or displaced linearly. By means of both movements, droplets of adhesive can thus be applied to any spot on the outside of the coil body, i.e., to any spot on the outermost layer of fiber. Due to this free selectability of the adhesive distribution, different processes for the coil winding can be realized, by which compact fiber coils with homogeneous winding can be produced automatically.

The winding device can further comprise a radiation source emitting in the wavelength range of UV and/or visible light for irradiating the adhesive applied to and/or between the fiber, wherein the droplets of adhesive consist of adhesive which cures under irradiation with UV and/or visible light. This allows the adhesive to be cured by irradiation as needed, thereby finishing the fiber coil in the already bonded area. In particular, each layer of the fiber coil can be fixed firmly and definitively to the previous one, making it possible to wind the fiber onto the coil body even under (moderate) tension, since, as the adhesive has already cured, the newly placed fiber cannot cut into the coil body and disturb the previously wound structure. In addition, process steps associated with separate curing are eliminated. The fiber coil can be completely finished without removing it from the winding device. This eliminates defects on the fiber coil caused by improper manual handling, which increases the reliability of the coils.

In this connection, photoinitiators in the adhesive can be matched to the spectral composition and intensity of the UV and/or visible light after having penetrated the fiber. Thus, the adhesive cures at radiation as it is present after the light from the radiation source has passed through the topmost fiber layer. This promotes complete curing. In addition, it can also be possible to cure the adhesive or the droplets of adhesive bonding multiple layers of fiber together by only one irradiation. The number of fiber layers that can be fixed in this way at one time depends on the specific material of the fiber and the intensity of the radiation that can be used without damaging the material. For example, 2, 5, 10, 50 or all fiber layers can be fixed at once by means of the radiation.

In this connection, the adhesive device can be suitable for applying droplets of adhesive to the outermost layer of fiber, while the winding of new fiber onto the coil body is being interrupted. The coil carrier and the fiber feeder can be suitable for winding new fiber onto the coil body after application of the droplets of adhesive in order to bond it to the outermost layer of fiber. The radiation source can be suitable for irradiating the droplets of adhesive thereon with light to cure the droplets of adhesive.

The winding of the fiber coil thus proceeds in three fully automated process steps. First, a series of adhesive dots is placed on the last wound fiber layer by means of the adhesive device, e.g., by means of a jet valve and a linear table, e.g., across the width of the previously wound coil body. The row of adhesive dots can be straight or curved. By rotating the coil carrier, it can also run diagonally or zigzag across the coil body. Ultimately, the droplets of adhesive can be applied to the fiber coil in any arrangement, and a net-like distribution would also be conceivable.

After the adhesive dots have been placed in at least one (or more) spot(s) on the coil body, the next layer of fiber is wound, i.e., another layer of fiber is wound around the entire width of the coil body. This newly wound fiber is bonded to the previously applied fiber by the droplets of adhesive.

Hereupon, the coil body is irradiated with radiation in the wavelength range of UV and/or visible light, which cures the adhesive. All the fiber that has already been wound is thus firmly bonded together. The process is then repeated until the fiber coil is completed. In this way, a compact and homogeneously wound fiber coil can be produced in a simple and rapid, fully automated manner.

Alternatively, the adhesive device can also be suitable for applying droplets of adhesive to the outermost layer of fiber, while new fiber is being wound onto the coil body. The coil carrier and fiber feeder can then be suitable for winding new fiber onto the coil body while applying the droplets of adhesive in order to bond it to the outermost layer of fiber to which droplets of adhesive have already been applied.

Thus, instead of interrupting the winding of the fiber as described above, the droplets of adhesive can also be applied continuously. For example, a droplet of adhesive can be shot straight onto a spot onto which new fiber is placed a short time later. The application of droplets of adhesive and the placing of fiber are thus slightly offset but parallel across the width of the coil body. This increases the production speed, since the winding of the coil does not have to be interrupted. However, this requires a more complex process control. Coil production using the stop-and-go method described above is therefore slower, but less prone to errors.

In the case of parallel bonding and winding, the radiation source can be suitable for irradiating the just applied droplets of adhesive with light during the winding of new fiber onto the coil body to cure it. For this purpose, the radiation source can focus the radiation on a limited area through which the fiber just coated with adhesive passes. Adhesive application, winding and curing thus take place within one revolution of the coil carrier, i.e., within the winding of a fiber loop. This makes the winding process even more effective.

Alternatively, the radiation source can also be suitable for irradiating the droplets of adhesive with light after winding has been interrupted. In this case, coating with adhesive and winding take place in parallel, e.g., to rewind a fiber layer. Once enough new fiber has been applied to the coil body (e.g., one, two or even multiple layers), winding is interrupted and the entire coil body is irradiated with light. Thus, all droplets of adhesive are cured at the same time. Although this has the disadvantage that the winding process has to be interrupted, it nevertheless offers the advantage of avoiding any difficult or inadequate focusing of the light, which could also cure adhesive that is not covered with fibers.

The irradiation with light can also take place only after multiple fiber layers bonded with droplets of adhesive have been wound or when the fiber coil has been wound completely. This represents a very simple variant for curing the adhesive.

It goes without saying that any other chemically reactive adhesive can be used instead of the above-described radical or polymerizing adhesive under radiation. These can be cyanoacrylates polymerizing by means of air humidity, methacrylates polymerizing under oxygen exclusion in the presence of metals, or adhesives that cure rapidly by means of polyaddition, polycondensation or vulcanization. In the case of thermally curing adhesives, it is possible to carry out curing in the oven or also by microwave radiation, IR radiation or inductive heating. Curing in the oven can be advantageous, for example, if a radiation source cannot be used due to space limitations.

The adhesive device can be suitable for applying the droplets of adhesive to the respective outermost layer of fiber in such a manner that air spaces are present between the droplets of adhesive and the fiber of the fiber coil, which are preferably connected to one another by air ducts. Thus, only a number of droplets of adhesive with a volume just sufficient to fix all fiber sections against each other are applied. The open-pore fiber coil thus produced is then very light. However, the open-pore fiber coil can also be additionally potted, as known from the prior art. This has the advantage that the high stability achieved by potting can be used without the disadvantage that the potting compound impairs the fiber arrangement, since the entire fiber has already been fixed beforehand.

Alternatively, the adhesive device can be suitable for applying the droplets of adhesive to the respective outermost layer of fiber in such a manner that the completely wound fiber coil has no air spaces between the fiber and the adhesive. The fiber coil is then produced directly and completely equivalent to a potted coil. In this case, at least the additional step of potting is omitted.

A fiber coil made of wound fiber can have superimposed layers of fiber bonded together with cured droplets of adhesive. The above-mentioned advantages can be achieved due to the use of droplets of adhesive, as they allow the aforedescribed direct and automatic bonding of newly wound fiber with already existing fiber.

The fiber coil can have an open-pore structure, i.e., air spaces can be present between the droplets of adhesive and the fibers of the fiber coil, which are preferably connected to one another by air ducts. This makes the fiber coil lighter than comparable potted coils. This can be advantageous for fiber coils intended for flight operations.

In this case, the fiber coil can be produced with a winding device as described above. The fiber coil thus realizes all the above-mentioned advantages in terms of homogeneity, compactness and cost efficiency.

The present invention will be described again in the following text with reference to the accompanying figures. However, this description is purely exemplary. The invention is defined exclusively by the subject matter of the claims, in which FIG. 1 shows a schematic representation of a winding device;

Figure 1:
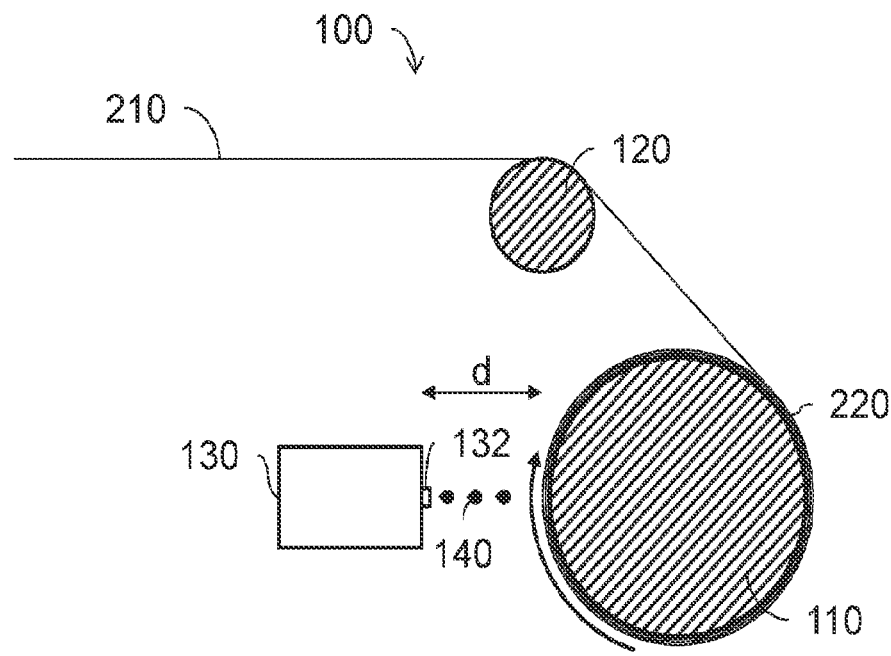

FIG. 1 schematically shows a winding device 100 for winding fiber coils 200 from one or more fibers 210. In this case, the fiber coils 200 are intended for use in fiber optic gyroscopes. Accordingly, the fibers 210 are preferably glass fibers provided with a coating. However, the winding device 100 can also be used for winding any fibers 210 that need to be bonded together to produce a finished product.

As shown in FIG. 1, the winding device 100 includes a coil carrier 110 and a fiber feeder 120. The fibers 210 are fed to and wound onto the coil carrier 110 via the fiber feeder 120. In this process, they form a coil body 220, which is constructed from a plurality of superimposed layers of fiber 210.

The winding of the fibers 210 onto the coil carrier 110 can be carried out according to any method known from the prior art. In the simplest case, one end of the fiber 210 is secured to the coil carrier 110 and wound onto it by rotating the coil carrier (as symbolized by the arrow), while the fiber feeder 120 ensures that the newly wound fibers 210 cover the entire width of the coil body 220 by movements perpendicular to the image plane.

If both ends of the finished coil 200 must be accessible from the outside, the fiber 210 is secured, for example, bonded, to a central section on the coil carrier 110 or a holder that can be secured to, e.g., fit onto, the coil carrier 110. The two ends of the coil are then alternately wound over the coil carrier 110, e.g., by rotating the coil carrier 110 with intermediate fixation of the fiber or by moving the fiber feeder 120 around the coil carrier 110. Since such winding methods are known to a person skilled in the art from the prior art, further explanations in this regard are omitted here.

The winding device 100 further comprises an adhesive device 130 which dispenses droplets of adhesive 140 from a discharge point 132. The droplets of adhesive 140 get onto the coil body 220 and/or the fed fiber 210 and bond the newly fed fiber 210 to fiber 210 already wound onto the coil body 220. Thus, the outermost layer of fiber 210 of the coil body 220 is bonded to the newly placed fiber 210.

As shown in FIG. 1 and as further explained below, the droplets of adhesive 140 can be directed directly onto the coil body 220 or the fiber 210 wound therein. However, it is also conceivable to direct the droplets of adhesive 140 onto the newly fed fiber sections. It would also be conceivable to place the coil carrier 110 and fiber feeder in a housing or the like, and to provide an adhesive mist of droplets of adhesive 140 in the housing which wets the fiber 210 on the coil body 220 and/or the new incoming fibers 210 with droplets which then serve for bonding.

The use of droplets of adhesive 140 for bonding offers the advantage that the "open-pore" fiber coils described with reference to FIG. 7 further below can be realized, which have a significantly lower adhesive content than conventionally produced fiber coils and are therefore, for example, lighter. In principle, this advantage can be achieved with any method of applying droplets of adhesive 140. In the following text, however, it should be assumed that the droplets of adhesive 140 are applied to the outermost layer of the coil body 220.

For this purpose, as shown in FIG. 1, the droplets of adhesive 140 are specifically shot onto the surface of the coil body 220. In this process, a droplet can have a weight of 4 µg to 14 mg or a volume of 4 nl to 14 µl, for example. Due to their low weight, the droplets of adhesive 140 can be delivered to the coil body 220 from any direction that is advantageous for a space-saving design of the winding device 100. For example, the droplets of adhesive 140 can also be shot from the bottom to the top without causing any negative effects.

Preferably, the size of the droplets of adhesive 140 can be volumetrically dosed in this case, i.e., the volume of the droplets of adhesive 140 is fixed at a certain value or can be set at a certain value.

An example of this is droplet generators or jet valves, which make use of jet valve technology, which is in itself known from the prior art. Nevertheless, a brief explanation of this technology should be given with reference to FIG. 2. However, this explanation should not be understood as restrictive.

Figure 2:
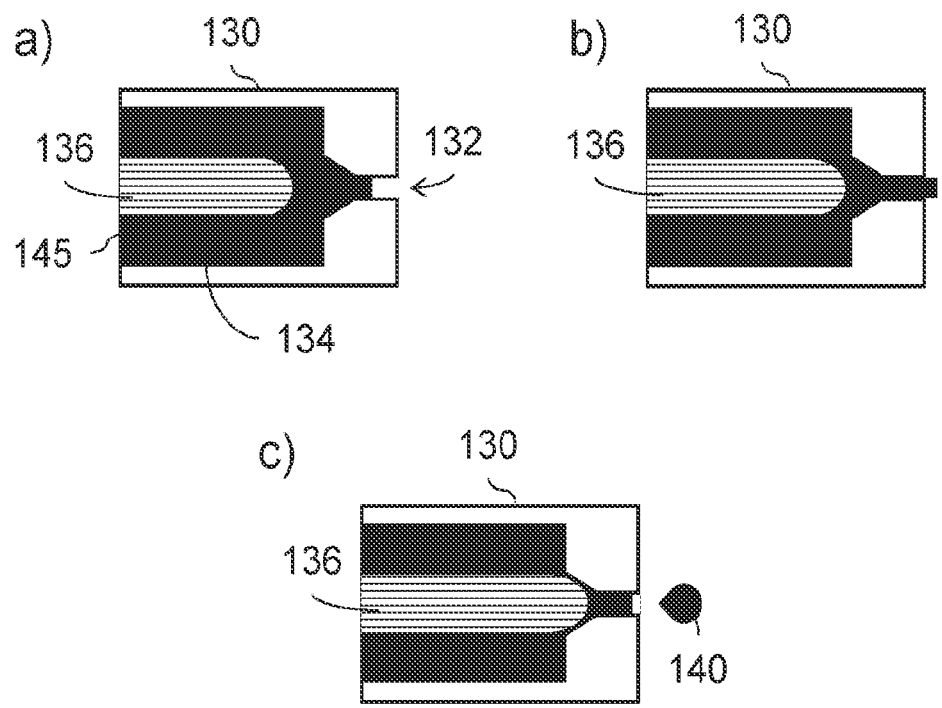
FIG. 2 shows schematic representations of an adhesive device using jet valve technology.

As shown in FIG. 2, in the adhesive device 130 configured as a jet valve, a nozzle-shaped discharge point 132 can be connected to an adhesive duct 134 in which adhesive 145 is located. The adhesive duct 134, in turn, can be connected to an adhesive reservoir that can be pre-pressurized to provide the transport of adhesive from the adhesive reservoir into the adhesive duct 134 and to the discharge point 132.

The adhesive 145 is forced into and out of the duct by a pneumatically or piezo-driven actuator by means of a high momentum cylinder 136, cf. FIG. 2b). The dynamic pressure at the tip of the cylinder 136 causes the surface energy and bonding forces within the adhesive 145 to be overcome, and a free-flying droplet is released from the discharge point 132, the size of which depends, in addition to the geometry of the adhesive device 130, only on the stroke of the cylinder 136. Thus, droplets of the same size are produced with the same stroke. In this case, the viscosity of the adhesive 145 has hardly any influence on the dosable quantity, provided that the cylinder 136 moves in the direction of the discharge point 132 only, after the adhesive duct 134 has been completely filled with adhesive from the reservoir. Adhesives 145 with up to 2000 Pa·s can be processed as described above.

Thus, by means of jet valve technology, volumetrically dosed droplets can be produced which exit the adhesive device 130 at a sufficiently high speed to exhibit a linear path in good approximation even against gravity for a distance of several centimeters. This allows the droplets of adhesive 140 to be shot onto the coil body 220 in a precisely positioned manner, thereby placing them on its surface. Due to the compact design size of such jet valves, they can also be integrated almost arbitrarily into existing winding machines.

The distance d from the discharge point 132 to the surface of the coil body 220 is preferably less than 5 cm, at most less than 10 cm, e.g., between 1 cm and 5 cm. Indeed, it has been found that, in addition to the desired main droplet on the coil body 220, smaller satellite droplets are formed around the main droplet for a greater distance. These satellite droplets can result in unwanted bonding points or, if cured prematurely, imperfections in the winding pattern. To avoid this, the distance d is preferably limited to less than 5 cm. The distance d can also be kept constant in this case if the adhesive device 130 can be moved away from the coil body 220 as the number of fiber layers in the coil body 220 increases, e.g., by means of a linear motor or the like.

Droplet ejection from the adhesive device 130 can be performed by means of a piezoelectric or pneumatic actuator. In this way, a large number of droplets per second can be ejected, e.g., up to 250, 300 or 350 droplets per second for pneumatic actuators and up to 2000 droplets per second for piezoelectric actuators. In this way, sufficiently large quantities of droplets of adhesive 140 can be produced to wet the coil body 220 fully automatically with adhesive 145 for application of the next fiber layer.

Examples of such jet valves represent micro-dispensing valves, hose pinch valves or diaphragm dispensing valves from the manufacturers DELO, Nordson, Techcon or BioFluidx.

Figure 3:
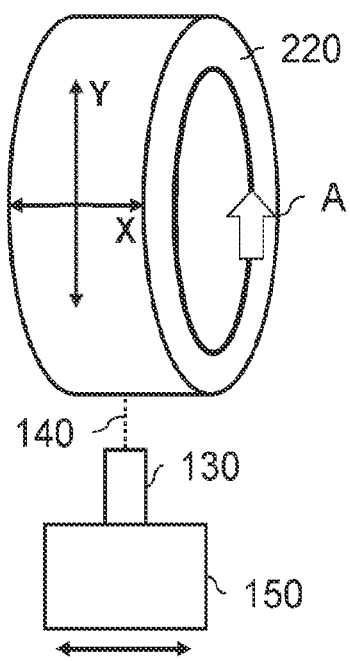
FIG. 3 shows a schematic representation of another winding device.

In this process, as shown schematically in FIG. 3, the droplets of adhesive can be positioned by means of a positioning device 150, with which the coil carrier 110 and/or the adhesive device 130 can be moved in such a manner that the droplets of adhesive 140 land on a predetermined position on the coil body 220. Optimally, the droplets of adhesive 140 strike the surface of the coil body 220 perpendicularly to avoid delocalization due to oblique incidence.

For example, the adhesive device 130 can be moved by a linear motor not only away from the coil body 220 (Y-direction in FIG. 3), but also along the width of the coil body (X-direction in FIG. 3). If necessary, movement can also be perpendicular to the image plane (Z-direction).

Furthermore, the adhesive device 130 can be dynamically adjustable in its angle to the coil surface so that droplets of adhesive 140 can be applied across the entire width of the coil body without movement across the width of the coil body (X-direction in FIG. 3).

Furthermore, the coil carrier 110 and thus the coil body 220 can be rotated, as symbolized by the arrow A in FIG. 3. This can also change the point of impact of the droplets of adhesive 140 on the coil body 220. In addition, it is also possible to displace the coil carrier 110 in the X, Y, and/or Z-direction, e.g., via a corresponding movement of an axis on which the coil carrier 110 is mounted. This is constructively more complex, but can make the movement of the adhesive device 130 superfluous, so that the positioning device 150 only acts on the coil carrier 110.

In this way, a large number of droplets of adhesive 140 can be applied in a fully automated manner to arbitrarily selectable spots on the surface of the coil body 220 in order to achieve an optimal bonding result and thus an optimal winding result.

The adhesive 145 from which the droplets of adhesive 140 are formed can, in this case, have a consistency that allows mutual fixation of sections of the fiber 210 without the adhesive 145 being completely cured. In this case, the completely wound coil body 220 can be removed from the winding device 100 in a conventional manner (e.g., while still on the coil carrier 110) and stored, placed in an oven, and/or irradiated with light to cure the adhesive 145. In addition, the coil body 220 can be additionally potted with a potting compound to provide more stability to the finished fiber coil 200.

Figure 4:
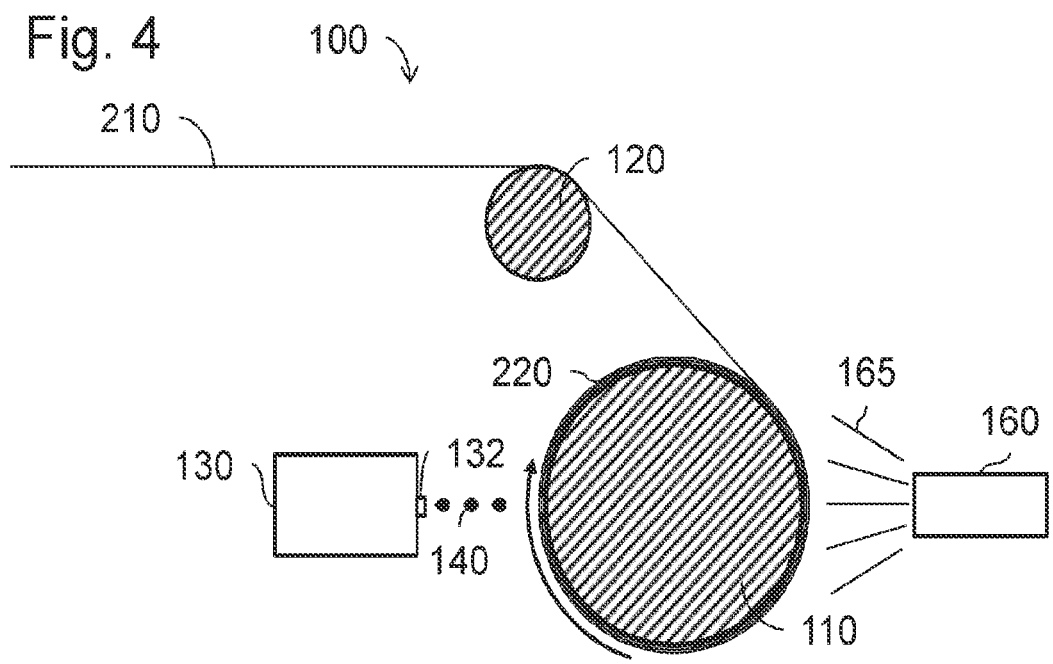
FIG. 4 shows a schematic representation of another winding device.

As shown in FIG. 4, the winding device 100 can also be equipped with a radiation source 160 that irradiates the coil body 220 with light 165 in the wavelength range of UV and/or visible light to cure the adhesive 145 while the coil body 220 is still in the winding device 100.

In principle, the adhesive 145 can be any adhesive known from the prior art that cures under radiation. The light used can have a wavelength of 100 nm to 780 nm, preferably from 300 nm to 550 nm, more preferably from 315 nm to 420 nm. For example, acrylates that cure exclusively under radiation can be used, such as DYMAX 431. Due to radical polymerization, these cure very quickly, e.g., in a period of a few seconds, approximately between 1s and 10s. Curing takes place only during irradiation and is therefore easily controllable.

Curing is fast and complete, and post-curing is not required. This makes it possible to bond sections of fiber 210 firmly together in a fast and reliable manner.

In contrast to 2-component reactive adhesives, radiation-curing reactive adhesives do not have a so-called pot life or open time, after which the viscosity of the adhesive increasingly increases and curing takes place. This means that with radiation-curing adhesives, regular cleaning of all components of the adhesive device 130 that come into contact with adhesive, such as the reservoir, ducts and the valve, can be omitted. It is sufficient to refill the adhesive regularly. Furthermore, the adhesive viscosity remains constant, which contributes to process stability.

So-called 1C epoxy resin adhesives can also be used. Cationic polymerization occurs in these within seconds following light activation. An example of this is DELO KATIOBOND. In adhesives 145 of this type, curing takes place even after the end of irradiation in shadow areas. As a result, curing is continuous and thus more homogeneous.

Alternatively, adhesives 145 for which thermal post-curing is possible can also be used. Examples of corresponding acrylates are Noa 83H or DELO DUALBOND. Such adhesives make it possible to preliminarily fix the fiber 210 by means of the radiation source 160 and to produce the subsequent final strength in an oven. Again, irradiation for a few seconds, e.g., only one or a few seconds, is sufficient for pre-curing. A wide range of adhesives can therefore be used. The decisive factor in this case is that the adhesives can be applied in an automated manner in droplet form to the incoming fiber 210 or the coil body 220.

Figure 5:
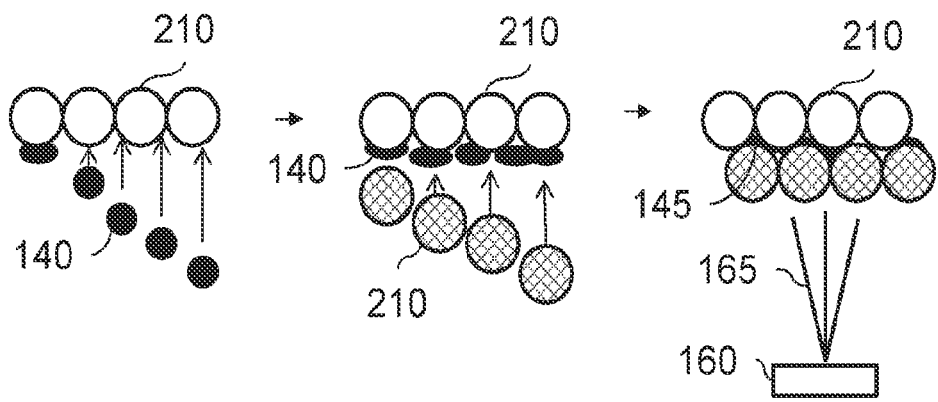
FIG. 5 shows a schematic representation of bonding fiber in a winding device.

The bonding and fixing of the superimposed fiber 210 is shown schematically in FIG. 5. First, a series of droplets of adhesive 140 is applied to the outermost layer of fiber 210. In this process, the droplets of adhesive 140 are distributed over the fiber 210 in such a manner that they permit bonding of the fiber 210 to the next layer of fiber. As shown in FIG. 5, the droplets of adhesive 140 are successively applied to the coil body 220 by means of the positioning device 150 after an appropriate adjustment of the relative position of the coil carrier 110 and the adhesive device 130. In principle, however, multiple adhesive devices 130 or one adhesive device 130 with multiple droplet outlets can also be provided, which allow simultaneous application of two or more droplets of adhesive 140.

In this case, the droplets of adhesive 140 can form a closed chain, i.e., they can be in communication with one another. However, they can also be separated from one another, i.e., they can lie individually. In principle, any arrangement of droplets of adhesive 140 is possible, as long as the entire fiber composite in the finished fiber coil 200 is fixed against one another in such a manner that the original winding of the fiber 210 is maintained, i.e., that a compact, homogeneously wound fiber coil 200 is formed. For this purpose, it is sufficient, for example, if a section of the fiber 210 is firmly connected to a single adjacent section of the fiber 210 in such a manner that no mutual displacement is possible as long as all sections of the fiber 210 form a network of fiber sections firmly connected in this way via droplets of adhesive 140. In addition, it can also be possible not to fix individual sections of the fiber 210 with adhesive as long as they are fixed in the coil body 220 due to the tight connection of the sections of the fiber 210 surrounding them.

After the droplets of adhesive 140 have been applied to the outermost layer of fiber, fiber 210 is wound onto the coil body 220 in accordance with the winding process carried out with the winding device 100 to form the next layer of fiber (shown hatched in FIG. 5). This fiber 210 is wound around the coil body 220 in such a manner that a compact, homogeneous winding is formed, e.g., in the form of a densest packing, as shown in FIG. 5. In this process, the newly placed sections of fiber 210 join with the existing sections of fiber 210. Subsequently, light 165 can be irradiated onto the freshly bonded sections of fiber 210 by means of the radiation source 160, resulting in (partial or complete) curing of the adhesive 145.

As shown in FIG. 5, the light 165 passes through the newly placed layer of fiber 210 before reaching the adhesive 145. As a result, spectral regions of the light 165 can be partially or fully absorbed before reaching the adhesive 145. It can therefore be advantageous to select the spectral composition of the light 165 such that a sufficiently large intensity of light 165 with a wavelength range reaches the adhesive 145 to trigger curing of the adhesive 145. In other words, the radiation and photoinitiators in the adhesive 145 can be matched advantageously so that the radiation can (still) trigger the curing of the adhesive 145 after passing through the outer fiber layer(s).

In this process, irradiation with light 165 may occur after application of each new layer of fiber 210, as shown in FIG. 5. However, the adhesive 145 can also be cured only after multiple sequences of fiber 210 and adhesive 145 have been applied. For this purpose, it must be possible to select the intensity of the light 165 such that even adhesive 145 behind multiple layers of fiber 210 can still absorb sufficient radiation of the required wavelength. It is also conceivable to irradiate the completely wound coil body 220 with light 165 first. Curing multiple layers of fiber at the same time simplifies the production process of the fiber coil 200.

On the other hand, curing the adhesive 145 fiber layer by fiber layer offers the advantage that newly wound fiber 210 is always placed onto a firmly bonded overall body and not onto a loosely bonded and thus deformable layering of fiber 210 and adhesive 145. This makes it possible to pull the newly placed fiber 210 more tightly over the coil body 220 than would be possible for adhesive bonds that have not been previously cured, since it is not possible to cut the newly placed fiber 210 into the still deformable coil body 220. This allows for a more compact arrangement of the fibers 210. In this connection, it should also be noted that, even with a relatively loose winding due to low tensile force after application of multiple fiber windings, the innermost fiber layers are subjected to greater pressure than the outer fiber layers due to the fiber layers wound on them. To avoid this effect, the tension on the fed fiber 210 would have to be reduced with increasing winding thickness, which is costly in terms of process technology. However, the effect can also be avoided or reduced in a simple manner by curing the bonding between 2 to 5 fiber layers if such curing is done before new fiber 210 is applied.

As indicated in FIG. 4, irradiation with light 165 can be carried out over the entire extent of the coil body 220 so that all of the adhesive 145 is cured at the same time. In this case, the light 165 must be shielded from those areas of the coil body 220 on which the droplets of adhesive 140 rest without being covered with new fiber 210. As shown in FIG. 4, the UV source for this purpose can be arranged on the side of the coil carrier 110 opposite the adhesive device 130. Then the coil body 220 or the coil carrier 110 provides the shielding. However, shielding means can also be provided to prevent light incidence with arbitrary positioning of the radiation source 160.

Alternatively, after the adhesive 145 has been completely covered with newly placed fiber 210, i.e., after a fiber layer has been completely wound, the entire coil body 220 can be irradiated with light 165. For this purpose, multiple radiation sources 160 can be used, or the winding process can be carried out in a housing which reflects the radiation, whereby complete exposure to light 165 can also be achieved with only a single radiation source 160.

Compared to a full-area irradiation with light 165, however, it can also be advantageous if the light 165 is irradiated in a focused manner only on a specific spot of the coil body 220, i.e., if curing of the adhesive 145 can be performed selectively and locally. This is shown, for example, in FIG. 5, where the radiation source 160 directs the light 165 only to an area of the width of a few adjacent fiber sections, thus irradiating, for example, 1, 5, 10, 50, 100 or 150 adjacent fiber sections at the same time. Such focusing can be achieved, for example, using an optical fiber that guides the light 165 to the desired spot. The end of the optical fiber that emits the light 165 can also be movable relative to the coil body 220, e.g., by means of a suspension for the optical fiber and linear motors connected thereto.

By combining the adhesive droplet positioning, the winding process and the irradiation, different process variants for winding and bonding fiber coils 200 can be realized.

Figure 6A:
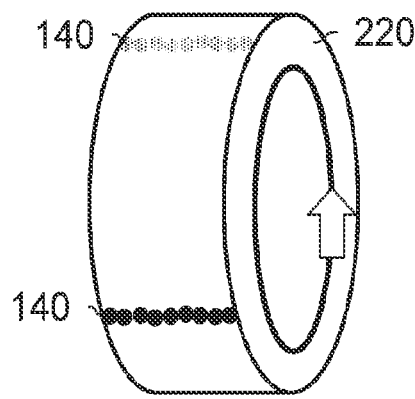
FIGS. 6A and 6B show another schematic representation of bonding fiber in a winding device.

For example, FIG. 6A schematically shows a process in which droplets of adhesive 140 are applied to the coil body 220 during an interrupted winding process. As indicated in FIG. 6A by the droplets of adhesive 140 being colored black, application of the droplets of adhesive 140 is performed in a row by displacing the adhesive device 130 by means of the positioning device 150 without applying fiber 210 to the coil body 220. The row can, in this case, be a line if a rotation of the coil carrier 110 or the coil body 220 is completely omitted. However, by rotation or additional movement of the adhesive device 130, a different sequence, such as a wavy line or a zigzag pattern, can also be achieved.

After these adhesive dots have been applied, the winding process is resumed and another layer of fiber 210 is wound onto the coil body 220. The droplets of adhesive 140 are thus covered by this new layer of fiber. This is shown in FIG. 6A for a previously applied row of adhesive dots by grayed out droplets of adhesive 140. The fiber coil 200 is thus formed by alternately applying droplets of adhesive 140 and then winding fiber 210 over these droplets of adhesive 140.

In this connection, prior to application of the next droplets of adhesive 140, the droplets previously covered with fiber—with the winding process again interrupted—can be cured by means of irradiation by the UV source 160, resulting in the three-step process of application of the adhesive, unwinding of the coil, curing of the adhesive, which is carried out continuously until the fiber coil is completed.

Figure 6B:
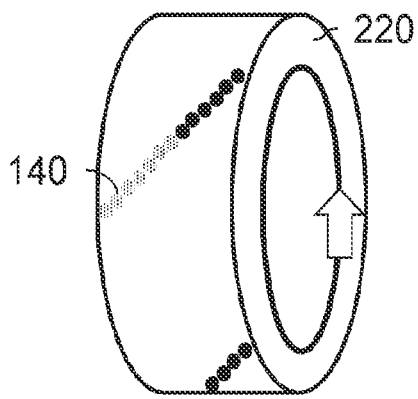

Whereas in FIG. 6A this three-step process is performed globally, i.e., with reference to the entire coil, it can also be performed locally, as shown in FIG. 6B.

In the example of FIG. 6B, the coil carrier 110 or the coil body 220 rotates while droplets of adhesive 140 are being applied. Linear displacement of the adhesive device 130 along the width of the coil body 220 results in a series of droplets of adhesive 140 running diagonally across the coil body 220.

New fiber 210 is continuously applied over these droplets of adhesive 140, as the winding device 100 is running. In FIG. 6B, droplets of adhesive 140 that have already been covered are shown in gray, while droplets of adhesive 140 that are on the outside are shown in black. Newly applied droplets of adhesive 140 are thus covered fiber layer by fiber layer, and the application of droplets of adhesive 140 precedes the application of new fiber 210, e.g., with an interval of a few fiber widths, e.g., 1, 5, 10, 20, 50 or 100 fiber widths.

The curing of the adhesive 145 can, in this case, be performed with the winding process interrupted, similar to the variant of FIG. 6A. After a layer of new fiber 210 has been placed on the corresponding droplets of adhesive 140, the winding process is stopped and, if possible, the complete coil body 220 is irradiated with light 165. The next adhesive layer is then applied while the winding process continues. Here too, there is accordingly a three-step process of applying the adhesive 145, winding the fiber 210 and curing the adhesive 145.

Alternatively, curing can also take place via local irradiation without interrupting the winding process. In this process, the light 165 is focused on droplets of adhesive 140 that are already covered with fiber 210. In addition, shielding is preferably provided with respect to uncovered droplets of adhesive 140. For example, light 165 can be emitted from an optical fiber terminating close to the coil body 220 in a nearly point-like manner onto the coil body 220. This variant achieves the highest production rate due to the lack of need to interrupt the winding process, but is complex in terms of process technology, since sufficient shielding of the light 165 and coordination of adhesive application, winding and curing must be ensured.

In all of the above variants, exposure to light 165 can also occur only after multiple fiber layers have been applied, as described above. Furthermore, in all variants, it is possible to provide multiple rows of adhesive dots per newly wound fiber layer to improve the stability of the winding. In addition, the radiation source 160 can also be used to specifically cure droplets of adhesive 140 on which no fiber 210 has yet been deposited. This can be done to specifically introduce spacers or special structures into the coil.

A number of other process designs are also possible. The decisive factor for the fully automatic and thus fast and cost-effective production of fiber coils 200 wound as compactly and homogeneously as possible is the sequence of applying adhesive 145 and winding fiber 210, supplemented if necessary by curing the adhesive 145 by appropriate irradiation. If this intermediate curing by irradiation is omitted, the curing can either take place after complete winding or the fiber coil 200 is thermally cured, e.g., in an oven.

Due to the use of individual droplets of adhesive 140 instead of applying adhesive 145 over the entire surface, fiber coils 200 with an open-pore structure can be produced. As shown in FIG. 7 by way of example of a section of a fiber coil 200, the fiber coil not only has fiber 210 in various layers and adhesive 145 which bonds the fiber 210. The fiber coil 200 also has air interspersed throughout a large portion thereof. This is shown in FIG. 7 based on a cross section through a portion of the fiber coil 200 (upper portion) and based on a top view of this portion of the fiber coil 200 (lower portion). In this process, a row of droplets of adhesive 140 as shown in the lower portion of FIG. 7 corresponds to a row of droplets of adhesive 140 of FIG. 6A or 6B.

Figure 7:
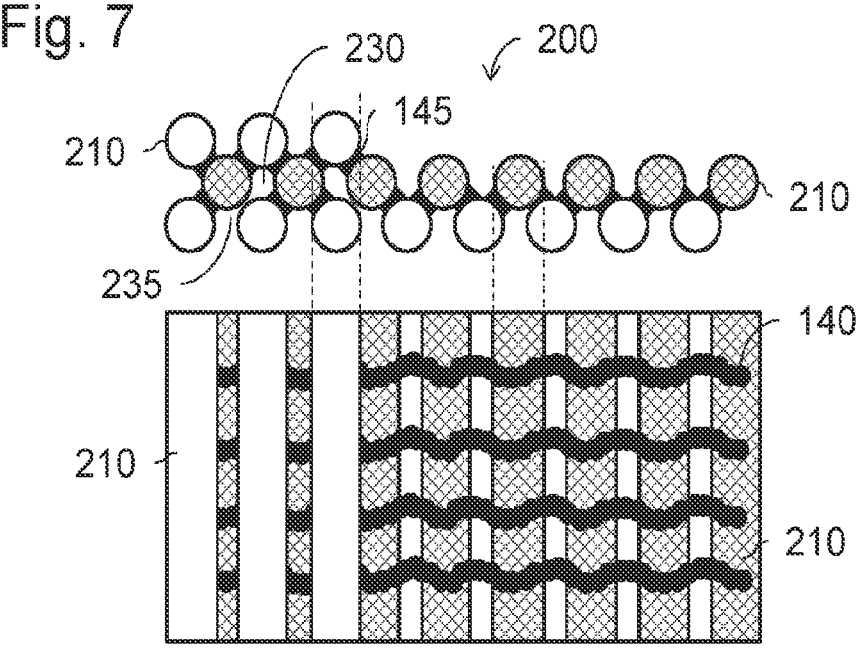
FIG. 7 shows schematic detailed views of a fiber coil.

As shown in FIG. 7, the droplets of adhesive 140 can be dosed in such a manner that air spaces 230 remain between the individual sections of fiber 210 or the individual fiber layers. These air spaces 230 can be connected by air ducts 235 formed, for example, by omitting droplets of adhesive 140 from an adhesive row. Thus, the entire fiber coil 200 is interspersed with a network of air spaces 230 or ducts, similar to a sponge or cork. This makes the fiber coil 200 comparatively light despite the stability created by the droplets of adhesive 140, which improves its potential use in fiber optic gyroscopes for flight operations.

However, the open-pore structure also means that fabrication can be accelerated, as less adhesive 145 needs to be applied to the coil body 220. Subsequently, the thus produced fiber coils 200 can be additionally potted. This can be done, e.g., by placing the coils in a bath of potting compound and then applying a vacuum. As a result, air is drawn out of the interspaces between the fibers 210 and potting compound flows in instead. The "fiber coil sponge" thus fully saturated with potting compound can then be cured in an oven. Alternatively, the open-pore fiber coil can be potted in a conventional manner in a potting mold.

If an open-pore structure is not desired, appropriate dosage and positioning can also be used to produce a fiber coil 200 that has a closed-pore structure, i.e., that individual air spaces 230 are not interconnected by ducts, or a fiber coil 200 in which all interspaces between fibers 210 are filled by adhesive 145. Such fiber coils 200 are heavier but have greater stability.

In all of the cases described above, the coil carrier 110 can be removed from the coil body 220 or from the finished fiber coil 200 after the adhesive 145 has cured. This allows pressure to be removed from the fiber 210, particularly, the inner fiber layers, thereby improving the coil properties.

The use of an adhesive device 130, which provides droplets of adhesive 140 for bonding fiber 210 that has already been wound with fiber 210 that is to be newly wound, makes it thus possible in the manner described above to produce fiber coils 200 that are of high quality, because they are wound homogeneously and compactly, in a fully automatic, fast and cost-efficient manner.

The invention claimed is:

1. A winding device for winding a fiber coil, comprising a coil carrier for wrapping with fiber in order to produce a coil body made of wound fiber;
a fiber feeder for feeding a fiber for wrapping the coil carrier; and
an adhesive device which is suitable for producing individual droplets of adhesive and for conveying each of the individual droplets of the adhesive in a substantially horizontal direction to a specific predetermined position on the outermost layer of fiber on the coil body to produce individual adhesive dots thereon and to bond the outermost layer of fiber on the coil body to fiber newly placed onto the coil body.

2. The winding device according to claim 1, wherein the adhesive device is suitable for producing the droplets of adhesive having a predetermined size.

3. The winding device according to claim 1, wherein a distance (d) of a discharge point of the droplets of adhesive from the adhesive device to the outermost layer of fiber is less than 10 cm.

4. The winding device according to claim 1, further comprising a positioning device suitable for moving the coil carrier and/or the adhesive device in such a manner that the droplets of adhesive hit a predetermined position on the outermost layer of fiber on the coil carrier.

5. The winding device according to claim 1, further comprising a radiation source emitting in the wavelength range of UV and/or visible light for irradiating the adhesive applied to and/or between the fiber, wherein the droplets of adhesive consist of adhesive which cures under irradiation with UV and/or visible light.

6. The winding device according to claim 5, wherein photoinitiators in the adhesive are matched to the spectral composition and intensity of the UV and/or visible light after penetration of the fibers.

7. The winding device according to claim 5, wherein
the adhesive device is suitable for applying droplets of adhesive to the outermost layer of fiber while the winding of new fiber onto the coil body is being interrupted;
the coil carrier and the fiber feeder are suitable for winding new fiber onto the coil body after application of the droplets of adhesive in order to bond it to the outermost layer of fiber; and
the radiation source is suitable for irradiating the droplets of adhesive thereon with light to cure the droplets of adhesive.

8. The winding device according to claim 5, wherein
the adhesive device is suitable for applying droplets of adhesive to the outermost layer of fiber while new fiber is being wound onto the coil body;
the coil carrier and the fiber feeder are suitable for winding new fiber onto the coil body while applying the droplets of adhesive in order to bond it to the outermost layer of fiber to which droplets of adhesive have already been applied; and
the radiation source is suitable for irradiating these droplets of adhesive with light during the winding of new fiber onto the coil body to cure them; or
the radiation source is suitable for irradiating the droplets of adhesive with light, after winding has been interrupted.

9. The winding device according to claim 7, wherein the irradiation with light takes place only after multiple fiber layers bonded with droplets of adhesive have been wound or when the fiber coil has been wound completely.

10. The winding device according to claim 1, wherein the adhesive device is suitable for applying the droplets of adhesive to the respective outermost layer of fiber in such a manner that air spaces are present between the droplets of adhesive and the fiber of the fiber coil, which are connected to one another by air ducts.

11. The winding device according to claim 1, wherein the adhesive device is suitable for applying the droplets of adhesive to the respective outermost layer of fiber in such a manner that the completely wound fiber coil has no air spaces between the fiber and the adhesive.

12. The winding device according to claim 1, wherein the adhesive device is suitable for producing the droplets of adhesive by means of a volumetric dosing method.

13. The winding device according to claim 1, wherein a distance (d) of a discharge point of the droplets of adhesive from the adhesive device to the outermost layer of fiber is less than 5 cm.

14. The winding device according to claim 1, further comprising a positioning device configured to move the coil carrier in an x, y, and z direction with respect to the adhesive device such that the droplets of adhesive are applied to selectable locations on the outermost layer of fiber on the coil carrier.

15. The winding device of claim 1, wherein the adhesive device comprises a jet valve comprising:
a nozzle-shaped discharge point;
an adhesive duct connected to the nozzle-shaped discharge point, the adhesive duct containing adhesive received from a reservoir; and
an actuator configured to apply pressure to the adhesive contained in the adhesive duct to release the droplets of adhesive from the nozzle-shaped discharge point,
wherein a size of each of the droplets of adhesive during a single actuation stroke are the same and are determined by a geometry of the adhesive duct and pressure applied by the actuator thereby providing the droplets having a specific volume.

* * * * *